United States Patent
Iketaka et al.

(10) Patent No.: US 10,622,862 B2
(45) Date of Patent: Apr. 14, 2020

(54) ELECTRIC COMPRESSOR MOTOR HOUSING, AND VEHICLE-MOUNTED ELECTRIC COMPRESSOR EMPLOYING SAME

(71) Applicant: MITSUBISHI HEAVY INDUSTRIES THERMAL SYSTEMS, LTD., Minato-ku, Tokyo (JP)

(72) Inventors: Goshi Iketaka, Tokyo (JP); Hiroshi Yamazaki, Tokyo (JP); Masayuki Ishikawa, Tokyo (JP); Keita Kitaguchi, Tokyo (JP); Hideo Saho, Tokyo (JP); Noriaki Arashi, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 273 days.

(21) Appl. No.: 15/558,129

(22) PCT Filed: Mar. 10, 2016

(86) PCT No.: PCT/JP2016/057515
§ 371 (c)(1),
(2) Date: Sep. 13, 2017

(87) PCT Pub. No.: WO2016/185770
PCT Pub. Date: Nov. 24, 2016

(65) Prior Publication Data
US 2018/0076681 A1 Mar. 15, 2018

(30) Foreign Application Priority Data
May 21, 2015 (JP) .................................. 2015-103778

(51) Int. Cl.
*H02K 5/04* (2006.01)
*F04B 39/06* (2006.01)
(Continued)

(52) U.S. Cl.
CPC ............... *H02K 5/04* (2013.01); *F04B 35/04* (2013.01); *F04B 39/06* (2013.01); *F04B 39/121* (2013.01);
(Continued)

(58) Field of Classification Search
CPC . H02K 11/33; H02K 5/18; H02K 5/22; H02K 9/005; H02K 9/08; F04B 35/04; F04B 39/06; F04B 39/121
See application file for complete search history.

(56) References Cited

U.S. PATENT DOCUMENTS

| 5,900,686 A | 5/1999 | Tabata et al. |
| 6,037,726 A | 3/2000 | Tabata et al. |

(Continued)

FOREIGN PATENT DOCUMENTS

| JP | 6-70507 A | 3/1994 |
| JP | 2004-162618 A | 6/2004 |

(Continued)

OTHER PUBLICATIONS

Written Opinion of the International Searching Authority and International Search Report (forms PCT/ISA/237 and PCT/ISA/210), dated Jun. 14, 2016, for International Application No. PCT/JP2016/057515, with English translations.

(Continued)

*Primary Examiner* — Emily P Pham
(74) *Attorney, Agent, or Firm* — Birch, Stewart, Kolasch & Birch, LLP

(57) ABSTRACT

An electric compressor motor housing is provided with: a motor housing main body (8), the interior of which is a cylindrical space for internally equipping a motor, and in which a plurality of refrigerant passages are formed around the cylindrical space, in the direction of the motor axis; an inverter accommodating portion (17) provided in an upper (Continued)

portion of the outer periphery of the motor housing main body (8); compressor attachment feet (19) provided in a plurality of locations in upper and lower portions of the outer periphery of the motor housing main body (8); and a refrigerant intake port (16) provided on a side surface toward the rear end of the motor housing main body (8); wherein one or more lines of ribs (24) are provided on the outer peripheral side surface of the motor housing main body (8), protruding outward and extending in the vertical direction.

20 Claims, 11 Drawing Sheets

(51) Int. Cl.

| | | |
|---|---|---|
| *H02K 5/20* | (2006.01) | |
| *H02K 5/18* | (2006.01) | |
| *H02K 5/22* | (2006.01) | |
| *H02K 9/08* | (2006.01) | |
| *F04B 39/12* | (2006.01) | |
| *H02K 11/33* | (2016.01) | |
| *F04B 35/04* | (2006.01) | |
| *H02K 9/00* | (2006.01) | |

(52) U.S. Cl.
CPC ............... *H02K 5/18* (2013.01); *H02K 5/20* (2013.01); *H02K 5/22* (2013.01); *H02K 9/005* (2013.01); *H02K 9/08* (2013.01); *H02K 11/33* (2016.01)

(56) References Cited

U.S. PATENT DOCUMENTS

| | | | |
|---|---|---|---|
| 6,054,818 A | 4/2000 | Tabata et al. | |
| 10,298,089 B2 * | 5/2019 | Takabe | H02K 7/14 |
| 2003/0161742 A1 | 8/2003 | Lin et al. | |
| 2003/0200761 A1 | 10/2003 | Funahashi et al. | |
| 2009/0289513 A1 | 11/2009 | Vadillo et al. | |
| 2010/0172772 A1 | 7/2010 | Watanabe et al. | |
| 2011/0266898 A1 | 11/2011 | Vadillo et al. | |
| 2012/0045353 A1 | 2/2012 | Watanabe et al. | |
| 2013/0119794 A1 | 5/2013 | Nagao et al. | |
| 2014/0144412 A1 * | 5/2014 | An | F02B 39/10 123/562 |
| 2014/0354088 A1 | 12/2014 | Kannegaard Andersen et al. | |
| 2015/0001973 A1 | 1/2015 | Mikkelsen et al. | |
| 2015/0044075 A1 | 2/2015 | Abe et al. | |
| 2015/0211525 A1 | 7/2015 | Damm et al. | |
| 2015/0333593 A1 | 11/2015 | Sofussen | |
| 2015/0340933 A1 * | 11/2015 | Hattori | H02N 7/003 310/71 |
| 2015/0349613 A1 | 12/2015 | Hattori et al. | |
| 2017/0127566 A1 * | 5/2017 | Imura | H05K 7/20309 |

FOREIGN PATENT DOCUMENTS

| | | |
|---|---|---|
| JP | 2004-197688 A | 7/2004 |
| JP | 2006-197785 A | 7/2006 |
| JP | 2009-92000 A | 4/2009 |
| JP | 2009-103100 A | 5/2009 |
| JP | 2012-117445 A | 6/2012 |
| JP | 2013-106365 A | 5/2013 |
| JP | 2014-165944 A | 9/2014 |
| WO | WO 93/23266 A1 | 11/1993 |
| WO | WO 2011/037136 A1 | 3/2011 |
| WO | WO 2013/171957 A1 | 11/2013 |

OTHER PUBLICATIONS

Office Action dated Nov. 26, 2019 in related Japanese Patent Application No. 2015-103778 with an English Translation.

* cited by examiner

ELECTRIC COMPRESSOR MOTOR HOUSING, AND VEHICLE-MOUNTED ELECTRIC COMPRESSOR EMPLOYING SAME

TECHNICAL FIELD

The present invention relates to an electric compressor motor housing in which an inverter circuit that drives a motor is integrally incorporated; and an inverter-integrated vehicle-mounted electric compressor in which the inverter circuit is integrally incorporated by using the motor housing.

BACKGROUND ART

In the related art, as a vehicle-mounted electric compressor used for a vehicular air conditioning device, an inverter-integrated vehicle-mounted electric compressor has been known. Such an inverter-integrated vehicle-mounted electric compressor includes an inverter accommodating portion on an outer periphery of a housing that includes a motor and a compressor. In the inverter accommodating portion, an inverter circuit that drives the motor is accommodated and installed, whereby the inverter circuit is incorporated integrally with the compressor.

In such a vehicle-mounted electric compressor, the housing that is the outline of the vehicle-mounted electric compressor is configured by integrally coupling a motor housing that includes the motor to a compressor housing that includes the compressor. For example, Patent Document 1 discloses an example in which an inverter accommodating portion, in which an inverter circuit is accommodated and installed, is provided in an upper portion (upper surface) of the outer periphery on the motor housing. The vehicle-mounted electric compressor further includes compressor attachment feet for installing the electric compressor to a vehicle. The compressor attachment feet are provided in a plurality of locations in an upper portion (upper surface) and a lower portion (lower surface) of the outer periphery on the motor housing. Furthermore, the vehicle-mounted electric compressor includes an intake port for a low-pressure refrigerant gas provided on a side surface on the rear end portion of the motor housing, and a discharge port for a high-pressure refrigerant gas on an outer peripheral side portion of the compressor housing.

For another example, Patent Documents 1 to 3 each disclose an example in which a plurality of refrigerant passages are provided around cylindrical space that includes a motor in the motor housing in the direction of the motor axis. The electric compressor motor housing in the example is configured to guide a low-pressure refrigerant gas introduced from a refrigerant intake port to inside the rear end portion of the motor housing through the refrigerant passages, toward the motor housing. This configuration can cool a motor and components (heat-releasing components, in particular) of an inverter circuit accommodated and installed in an inverter accommodating portion on an outer periphery of the motor housing.

CITATION LIST

Patent Documents

Patent Document 1: Japanese Unexamined Patent Application Publication No. 2014-165944A
Patent Document 2: Japanese Unexamined Patent Application Publication No. 2013-106365A
Patent Document 3: Japanese Unexamined Patent Application Publication No. 2006-197785A

SUMMARY OF INVENTION

Technical Problems

In the vehicle-mounted electric compressor configured as described above, the motor housing is configured such that the inverter accommodating portion is provided in the upper portion of the outer periphery on the motor housing. The motor housing is further configured such that the compressor attachment feet for installing the electric compressor to a vehicle are also provided in a plurality of locations in the upper portion and the lower portion of the outer periphery on the motor housing. Therefore, the rigidity in the upper portion (upper surface) and the lower portion (lower surface) is ensured sufficiently. However, the rigidity in both side portions (both side surfaces) needs to be ensured by only a thickness of a housing wall. If the wall thickness is reduced, the rigidity on both side portions (both side surfaces) is insufficient and thus the housing in a tubular shape is deformed and crushed in the vertical direction, thereby unfortunately sometimes generating vibration and noise.

In addition, the inverter accommodating portion provided in the upper portion of the outer periphery of the motor housing is sometimes defined to have a larger width than that of the main body portion of the motor housing. Heat-releasing components included in the inverter circuit are cooled by releasing the heat from the components to the refrigerant flowing through the refrigerant passages via the inverter accommodating portion and a wall portion (heat transfer portion) of the motor housing. However, if the heat-releasing components are accommodated and installed in the larger wide portion, the heat-releasing is restricted by the thickness of the wall portion, thereby reducing cross-sectional area of the heat transfer portion, and increasing heat-passing resistance. This leads to insufficient cooling effect, whereby performance is liable to be degraded due to the heat released from the components.

In light of the foregoing, an object of the present invention is to provide an electric compressor motor housing in which rigidity of a motor housing main body is increased and deformation thereof is suppressed, thereby reducing vibration and noise and increasing cooling performance of components of the inverter circuit, whereby performance degradation caused by the heat release is suppressed and reliability is increased; and a vehicle-mounted electric compressor employing the electric compressor motor housing.

Solution to Problem

The electric compressor motor housing and the vehicle-mounted electric compressor employing the electric compressor motor housing of the present invention adopt the following means in order to solve the problems described above.

An electric compressor motor housing according to an aspect of the present invention includes a motor housing main body, one end of which is an opening portion capable of coupling to a compressor housing, and the interior of which is a cylindrical space for including a motor. The electric compressor motor housing further includes a plurality of refrigerant passages formed around the cylindrical space in the motor housing main body in the direction of the motor axis. The electric compressor motor housing further includes an inverter accommodating portion provided in an upper portion of the outer periphery of the motor housing main body, in which an inverter circuit that drives the motor is accommodated and installed. The electric compressor motor housing further includes compressor attachment feet provided in a plurality of locations in upper and lower portions of the outer periphery of the motor housing main body. Furthermore, the electric compressor motor housing includes a refrigerant intake port provided on a side surface on the rear end portion of the motor housing main body and communicated with the internal space thereof. One or more lines of ribs are provided on the outer peripheral side surface of the motor housing main body, protruding outward and extending in the vertical direction.

According to the aspect of the invention, the electric compressor motor housing includes the motor housing main body, the interior of which is the cylindrical space for including the motor, and in which the refrigerant passages are formed around the cylindrical space, in a direction of a motor axis. The electric compressor motor housing further includes the inverter accommodating portion provided in the upper portion of the outer periphery of the motor housing main body. The electric compressor motor housing further includes the compressor attachment feet provided in a plurality of locations in upper and lower portions of the outer periphery of the motor housing main body, and the refrigerant intake port provided on the side surface on the rear end portion of the motor housing main body. One or more lines of the ribs are provided on the outer peripheral side surface of the motor housing main body, protruding outward and extending in the vertical direction. That is, the one or more lines of ribs protruding outward and extending in the vertical direction are provided on the outer peripheral side portion (side surface) of the motor housing main body where the rigidity is often insufficient. In contrast, the upper portion (upper surface) and the lower portion (lower surface) of the outer periphery of the motor housing main body is ensured to have sufficient rigidity because the inverter accommodating portion and the compressor attachment feet are provided thereon. The ribs can thus increase the rigidity of the motor housing main body without increasing the wall thickness of the entire housing. In addition, the ribs increase the cross-sectional area of a wall portion (heat transfer portion) coupling the outer peripheral side portion of the motor housing main body to the inverter accommodating portion provided in an upper portion of the outer periphery of the motor housing main body. This configuration can increase the area of a radiating surface for heat transfer from the inverter accommodating portion to the refrigerant flowing through the refrigerant passages inside the motor housing main body. This configuration can therefore increase the rigidity of the motor housing and suppress deformation thereof, thereby reducing vibration and noise. In addition, this configuration can increase cooling performance of components of the inverter circuit accommodated and installed in the inverter accommodating portion. This suppresses performance degradation caused by heat release from the components, and increases the reliability.

Furthermore, in the electric compressor motor housing according to the aspect of the present invention, in the above-described electric compressor motor housing, ribs are provided in at least one line for each of the positions corresponding to the installation positions of a condenser and a coil included in the inverter circuit accommodated and installed along one side of the inverter accommodating portion.

According to the aspect of the invention, at least one line of the ribs is provided for each of the positions corresponding to the installation positions of the condenser and the coil included in the inverter circuit accommodated and installed along one side of the inverter accommodating portion. The cross-sectional area of the heat transfer portion (wall portion) is increased by the ribs provided on the positions corresponding to the installation positions of the condenser and the coil. Therefore, even if the condenser and the coil included in the filter circuit of the inverter circuit are accommodated and installed along one side of the inverter accommodating portion, the heat from the condenser and the coil can be released to the refrigerant flowing through the refrigerant passages inside the motor housing main body via the heat transfer portion (wall portion). Therefore, this configuration achieves the following effect in addition to increasing the rigidity of the motor housing to reduce vibration and noise. That is, the configuration can also ensure the cooling performance of the condenser and the coil included in the filter circuit of the inverter circuit, thereby suppressing performance degradation caused by the heat released from the components. Furthermore, the configuration can increase the flexibility of layout of the components included in the filter circuit.

Furthermore, in the electric compressor motor housing according to the aspect of the present invention, in any one of the above-described electric compressor motor housings, at least one of the ribs is provided in the vicinity of and along the mating surface of the opening portion capable of coupling to the compressor housing.

According to the aspect of the invention, at least one of the ribs is provided in the vicinity of and along the mating surface of the opening portion capable of coupling to the compressor housing. Therefore, when the electric compressor is mounted on a vehicle and if rainwater is scattered from a road surface to a side surface of the motor housing main body while driving, or a cleaning fluid enters there while washing, this configuration can prevent the rainwater or cleaning fluid and the like from reaching the mating surface between the motor housing main body and the compressor housing, because of the rib provided along the mating surface. Therefore, this configuration achieves the following effect in addition to increasing the rigidity of the motor housing to reduce vibration and noise, and increasing cooling performance of components of the inverter circuit, thereby suppressing performance degradation caused by the heat released from the components. That is, the configuration can further increase corrosion resistance of a seal member and the like provided on the mating surface between the motor housing and the compressor housing.

Furthermore, in the electric compressor motor housing according to the aspect of the present invention, in any one of the above-described electric compressor motor housings, one or more lines of the ribs are provided on one side portion of the motor housing main body. The height of protrusion of the ribs is defined same as the height of a side surface of the inverter accommodating portion, thereby forming a flat surface flush with the side surface of the inverter accommodating portion.

According to the aspect of the invention, one or more lines of the ribs are provided on one side surface of the motor housing main body. The height of protrusion of the ribs is defined same as the height of a side surface of the inverter accommodating portion, thereby forming a flat surface flush with the side surface of the inverter accommodating portion. Therefore, when handling the electric compressor, the electric compressor can be placed in a stable manner with the flat surface formed on the side surface of the motor housing main body facing down. Therefore, this configuration achieves the following effect in addition to increasing the rigidity of the motor housing to reduce vibration and noise, and increasing cooling performance of components of the inverter circuit, thereby suppressing performance degradation caused by the heat released from the components. That is, the configuration can also facilitate handling when incorporating the electric compressor to a vehicle.

Furthermore, in the electric compressor motor housing according to the aspect of the present invention, in any one of the above-described electric compressor motor housings, one or more lines of the ribs are provided on the side surface same as the side surface on which the refrigerant intake port on the motor housing main body is provided. The height of outward protrusion of the ribs is defined higher than the positions of a seat surface of the refrigerant intake port and a seat surface of the compressor attachment feet.

According to the aspect of the invention, one or more lines of the ribs are provided on the side surface same as the side surface on which the refrigerant intake port on the motor housing main body is provided. The height of outward protrusion of the ribs is defined higher than the positions of the seat surface of the refrigerant intake port and the seat surface of the compressor attachment feet. This configuration can prevent the seat surfaces from being damaged because the height of protrusion of the ribs is defined higher than the seat surfaces. This effect is achieved when placing the motor housing with the side surface facing down on which the seat surface of the refrigerant intake port and the seat surface of the compressor attachment feet are provided. The effect is also achieved when other articles come into contact with the side surface. Therefore, this configuration achieves the following effect in addition to increasing the rigidity of the motor housing to reduce vibration and noise, and increasing cooling performance of components of the inverter circuit, thereby suppressing performance degradation caused by the heat released from the components. That is, the configuration can also eliminate refrigerant leakage or faulty installation of the electric compressor caused by damage to the seat surface or the seat surface, for example.

Furthermore, in the electric compressor motor housing according to the aspect of the present invention, in any one of the above-described electric compressor motor housings, one or more lines of the ribs are provided on the side surface same as the side surface on which the refrigerant intake port on the motor housing main body is provided. The height of outward protrusion of the ribs is defined higher than the height of outward protrusion on the side surface of the inverter accommodating portion.

According to the aspect of the invention, one or more lines of the ribs are provided on the side surface same as the side surface on which the refrigerant intake port on the motor housing main body is provided. The height of outward protrusion of the ribs is defined higher than the height of outward protrusion on the side surface of the inverter accommodating portion. This configuration can protect the inverter circuit accommodated in the inverter accommodating portion if the electric compressor is mounted in a vehicle with the side surface of the motor housing main body, on which the ribs are provided, facing forward. This effect is achieved if the vehicle is involved in a collision accident and the ribs portion having high rigidity can receive an impact thereof, for example. Therefore, this configuration achieves the following effect in addition to increasing the rigidity of the motor housing to reduce vibration and noise, and increasing cooling performance of components of the inverter circuit, thereby suppressing performance degradation caused by the heat released from the components. That is, the configuration can also prevent a high-voltage short circuit caused by damage to the inverter accommodating portion if the vehicle is involved in a collision accident, and suppress expansion of the accident.

Furthermore, in the vehicle-mounted electric compressor according to the aspect of the present invention, in any one of the above-described electric compressor motor housings, an opening portion at one end of the motor housing is coupled to the compressor housing including the compressor. Therefore, the inverter circuit is integrally incorporated in the housing including the motor and the compressor.

According to the aspect of the invention, in any one of the above-described electric compressor motor housings, an opening portion at one end thereof is coupled to the compressor housing including the compressor. That is, the vehicle-mounted electric compressor is configured such that the inverter circuit is integrally incorporated in the housing including the motor and the compressor. This configuration can therefore increase the rigidity of the motor housing of the electric compressor and suppress deformation thereof, thereby reducing vibration and noise. In addition, this configuration can increase cooling performance of components of the inverter circuit accommodated and installed in the inverter accommodating portion. This suppresses performance degradation caused by the heat released from the components. The configuration can thus increase the reliability and achieve the vehicle-mounted electric compressor with lower noise.

Advantageous Effects of Invention

According to the present invention, the one or more lines of ribs protruding outward and extending in the vertical direction are provided on the outer peripheral side surface (side surface) of the motor housing main body where the rigidity is often insufficient. In contrast, the upper portion (upper surface) and the lower portion (lower surface) of the outer periphery of the motor housing main body is ensured to have sufficient rigidity because the inverter accommodating portion and the compressor attachment feet are provided thereon. The ribs can thus increase the rigidity of the motor housing main body without increasing the wall thickness of the entire housing. In addition, the ribs increase the cross-sectional area of a wall portion (heat transfer portion) coupling the side surface of the motor housing main body and the inverter accommodating portion provided in the upper portion of the outer periphery of the motor housing main body. This configuration can increase the area of a radiating surface for heat transfer from the inverter accommodating portion to the refrigerant flowing through the refrigerant passages inside the motor housing main body. This configuration can therefore increase the rigidity of the motor housing and suppress deformation thereof, thereby reducing vibration and noise. In addition, this configuration can increase cooling performance of components of the inverter circuit accommodated and installed in the inverter accommodating portion, thereby suppressing performance degradation caused by the heat released from the components. The configuration can thus increase the reliability. In addition, a vehicle-mounted electric compressor with higher reliability and lower noise can be provided.

DESCRIPTION OF EMBODIMENTS

Figure 1:
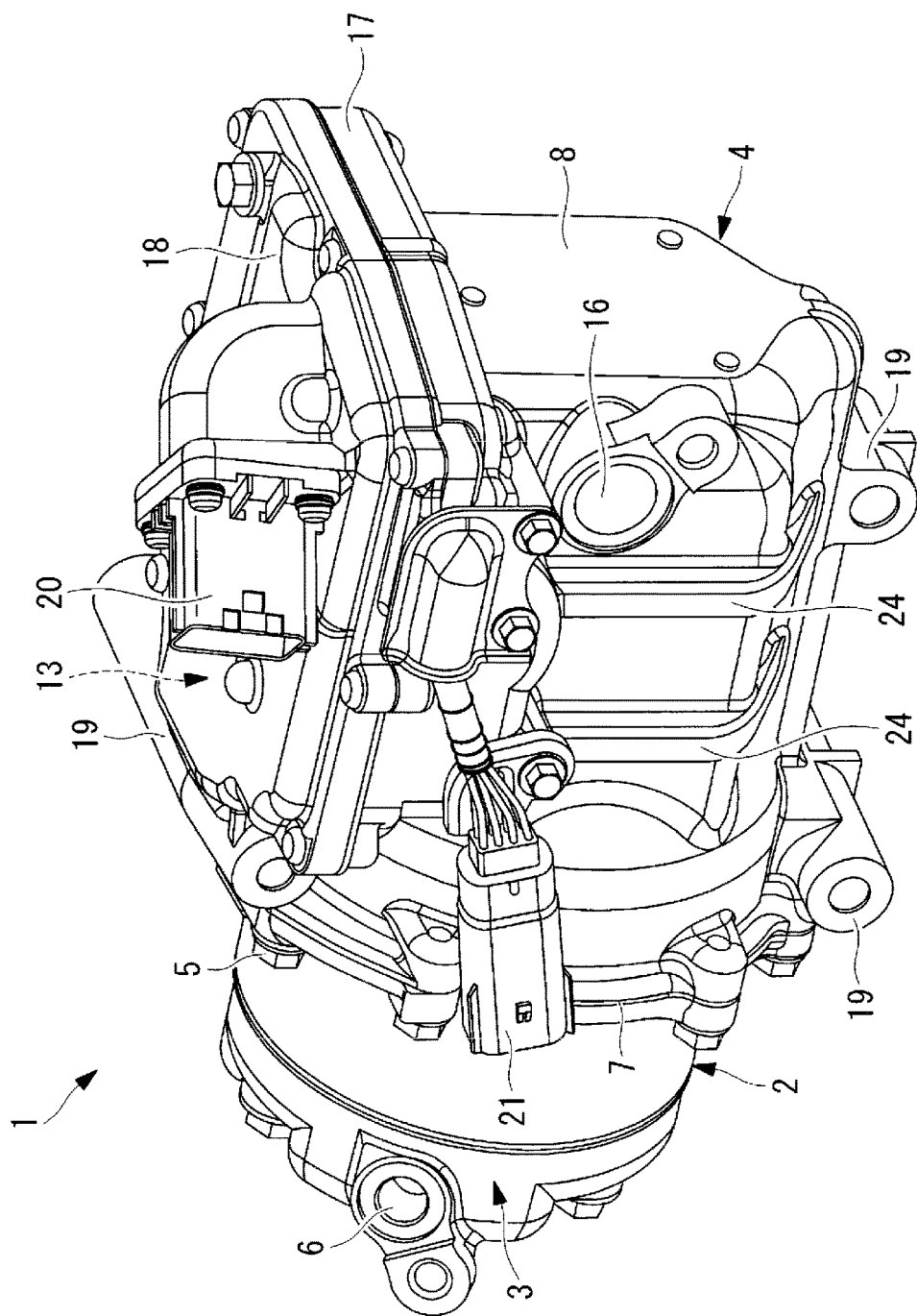
FIG. 1 is a perspective view of a vehicle-mounted electric compressor according to a first embodiment of the present invention.
Figure 2:
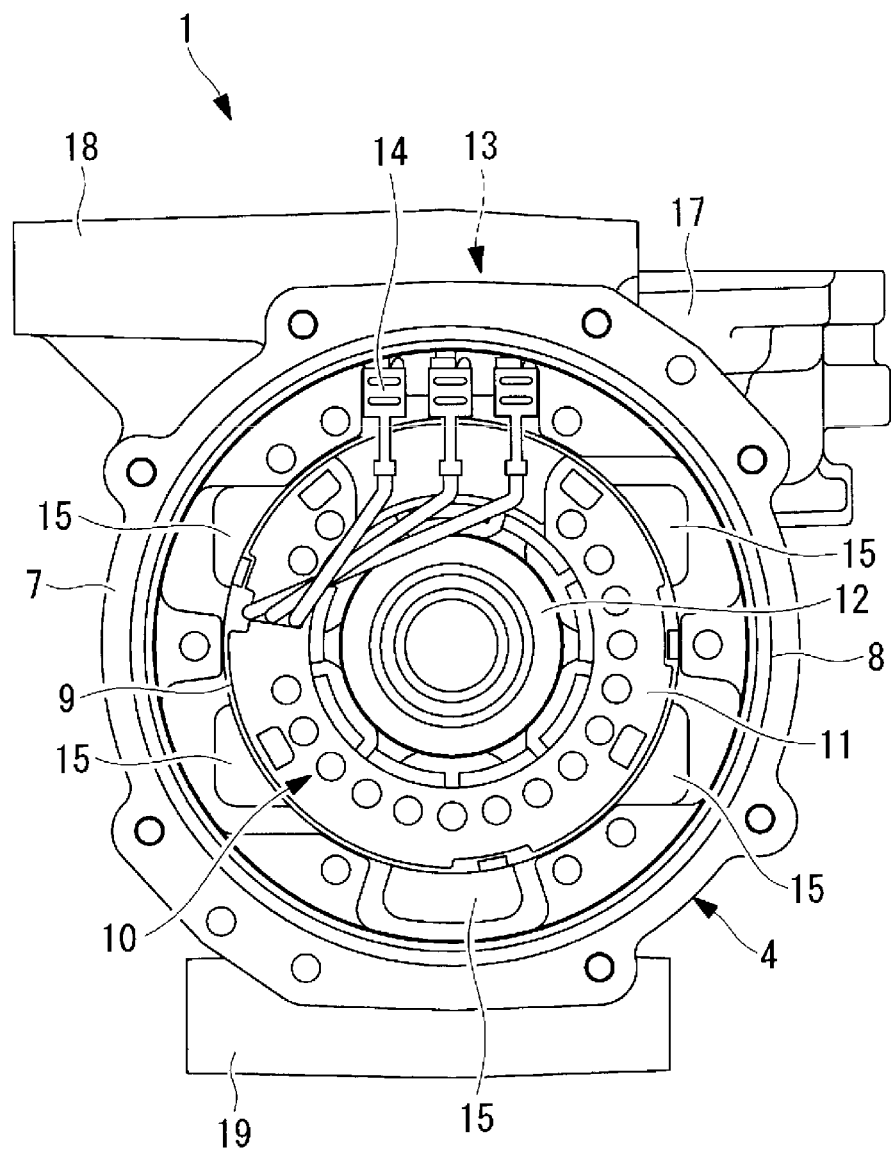
FIG. 2 is a front view of a motor housing viewed from the front side of the above-described vehicle-mounted electric compressor from which a compressor housing is removed.
Figure 3:
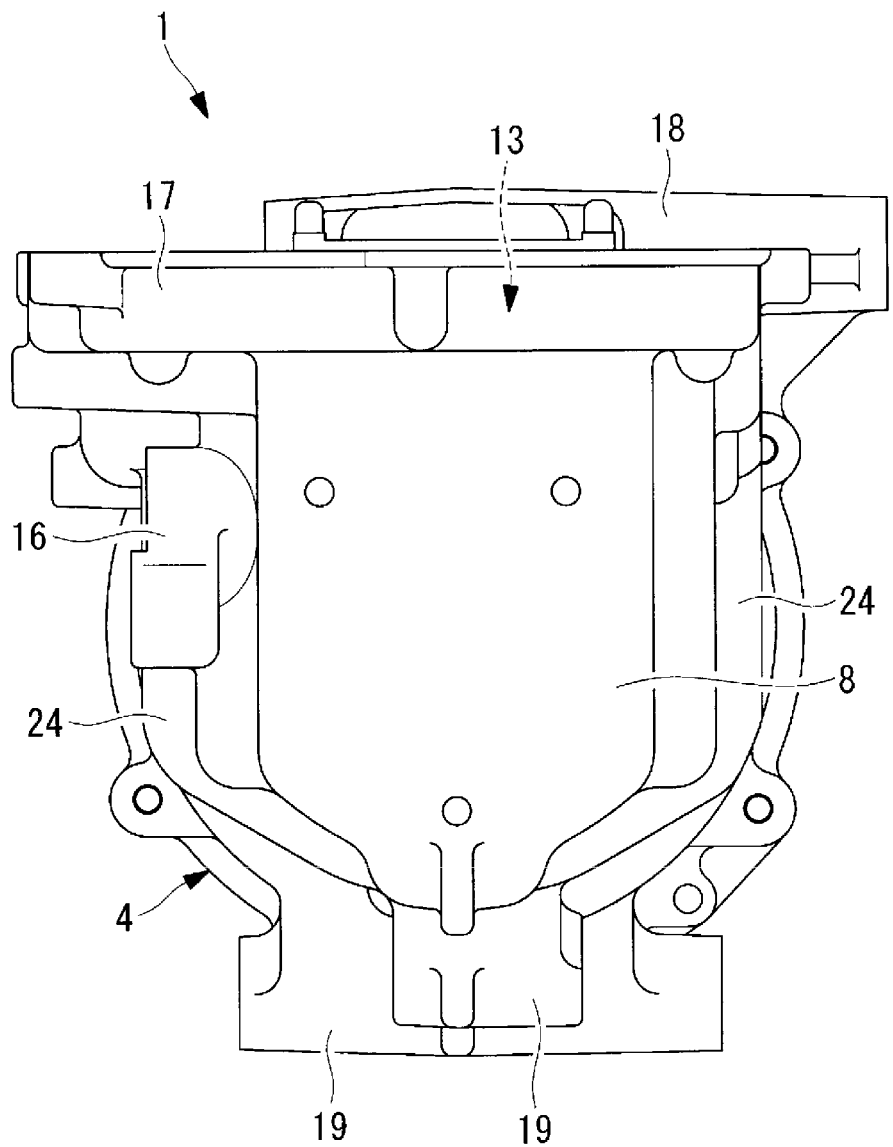
FIG. 3 is a rear view of FIG. 2.
Figure 4:
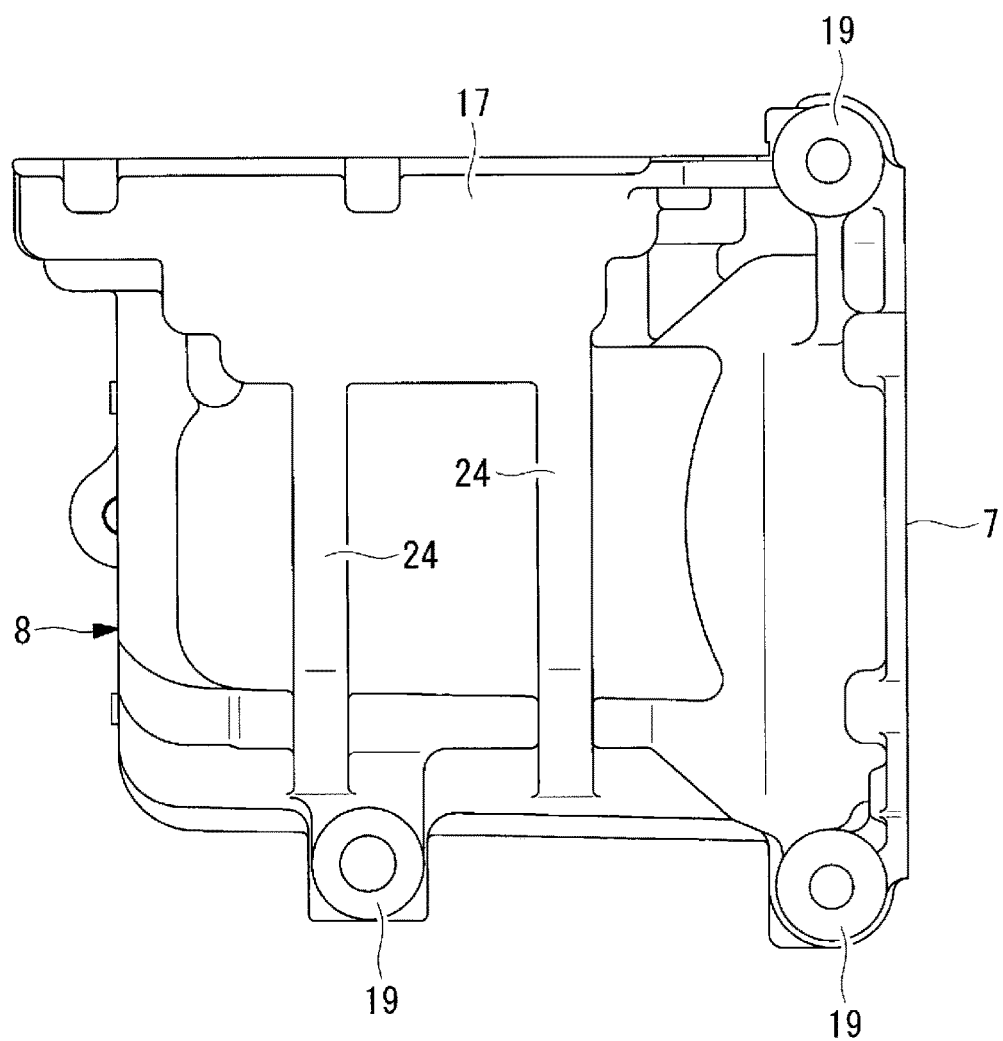
FIG. 4 is a left side view of FIG. 2.

Embodiments of the present invention will be described below with reference to the drawings.

First Embodiment

A first embodiment of the present invention will be described below with reference to FIGS. 1 to 7C.

A vehicle-mounted electric compressor 1 includes a housing 2 in a tubular shape that is the outline of the vehicle-mounted electric compressor 1. The housing 2 includes a compressor housing 3 including a compressor and a motor housing 4 including a motor 10. The compressor housing 3 and the motor housing 4 are made of aluminum die-cast and integrally coupled to each other by a flange joint with a plurality of bolts 5.

The compressor housing 3 includes various types of compressors such as a scroll compressor, in the inside thereof. The compressor housing 3 is configured to compress a low-pressure refrigerant gas taken from a refrigerant circuit via the motor housing 4 to a high pressure by using the compressor. The compressor housing 3 is configured to then discharge the refrigerant gas with high pressure from the refrigerant discharge port 6 provided on the outer peripheral front end portion of the compressor housing 3 to the refrigerant circuit.

The motor housing 4 includes a motor housing main body 8 in a tubular shape, one end of which is open to be coupled to the compressor housing 3 via a mating surface 7, and the other end of which is closed. A cylindrical space 9 including the motor 10 in the inside thereof is thus defined in the motor housing 4. The motor 10 includes a stator 11 and a rotor 12. The stator 11 is fixed to and installed in the cylindrical space 9 by press fitting and the like. The rotor 12 is fitted to the center portion of the stator 11 with a motor gap interposed therebetween. The motor 10 is driven to rotate by three-phase AC power at a required frequency applied from a later-described inverter circuit 13 via a vacuum-tight feedthrough 14.

In the motor housing main body 8, a plurality of refrigerant passages 15 are formed extending in the direction of a motor axis in a plurality of locations around the cylindrical space 9 including the stator 11. The refrigerant passages 15 are configured to guide a low-pressure refrigerant gas introduced from a refrigerant intake port 16 provided on a side portion (side surface) on the rear end side of the motor housing main body 8 to the motor housing main body 8, to the compressor housing 3 through the refrigerant passages 15.

In addition, an inverter accommodating portion 17 and compressor attachment feet 19 for installing the compressor to a vehicle are disposed around the outer periphery of the motor housing main body 8. The inverter accommodating portion 17 formed in a rectangular shape in plan view is provided in an outer peripheral upper portion by integral molding. The inverter circuit 13 (specific circuit drawing is omitted) is accommodated and installed in the inverter accommodating portion 17 with a cover 18 capable of sealing the inverter accommodating portion 17. The compressor attachment feet 19 for installing the compressor to a vehicle are disposed in three areas (three or four areas, for example) in upper and lower areas on the front end portion and a lower area on the rear end portion. The compressor attachment feet 19 are capable of fixing and installing the compressor to a vehicle in appropriate positions via a mounting bracket and the like.

The inverter accommodating portion 17 is configured to accommodate and install the inverter circuit 13 (specific circuit drawing is omitted) in the inside thereof and to be sealed by the cover 18. The inverter circuit 13 is a publicly known circuit including a power circuit board, a print circuit board, a filter circuit and the like. On the power circuit board, a switching circuit including a power transistor such as an IGBT is implemented. On the print circuit board, a control circuit such as a microcomputer that controls the power circuit board is implemented. The filter circuit is used for removing noise. The inverter circuit 13 is configured to convert a high-voltage DC power supplied from a power supply unit via a power supply cable and a terminal block 20 provided on the cover 18 to a three-phase AC power at required frequency. The inverter circuit 13 is configured to then apply the power to the motor 10. In addition, to the control circuit of the inverter circuit 13, control signals from a host control device can be input via a control and communication cable 21.

The inverter circuit 13 has heat-releasing electrical components such as a power transistor, and a condenser 22 and a coil 23 included in a high-voltage system filter circuit. Such heat-releasing electrical components need to be cooled suitably to maintain performance thereof for a long time. The bottom surface of the inverter accommodating portion 17 corresponds to a wall of the motor housing main body 8. Inside the wall, the refrigerant passages 15 are formed. The heat-releasing electrical components included in the inverter circuit 13 are therefore cooled by the low-pressure refrigerant flowing through the inside of the motor housing main body 8 by using the motor housing main body 8 as a heat sink.

On this occasion, the size of the inverter accommodating portion 17 formed in a rectangular shape in plan view is defined greater than the rear end surface and both side surfaces of the motor housing main body 8, thus slightly protruding backward and laterally therefrom. This configuration cannot sufficiently transfer the heat released from the electrical components accommodated and installed along both side portions and along the rear end portion in the inverter accommodating portion 17 to the parts where the refrigerant passages 15 are provided via the wall portion (heat transfer portion) of the inverter accommodating portion 17 and the motor housing main body 8, whereby cooling may be insufficient.

To the motor housing main body 8 formed in a tubular shape, the inverter accommodating portion 17 and the compressor attachment feet 19 are provided on the upper portion (upper surface) and the lower portion (lower surface) of the outer periphery of the motor housing main body 8. This configuration ensures that sufficient rigidity is provided. In contrast, no component to ensure such rigidity is provided on both side portions (both side surfaces) of the motor housing main body 8. The rigidity thereof needs to be ensured by maintaining a certain thickness of a housing wall of the motor housing main body 8. However, if the wall thickness is reduced to reduce in weight thereof, the rigidity on both side portions (both side surfaces) is insufficient and thus the housing in a tubular shape is deformed and crushed in the vertical direction. This may unfortunately generate vibration and noise.

Figure 5:
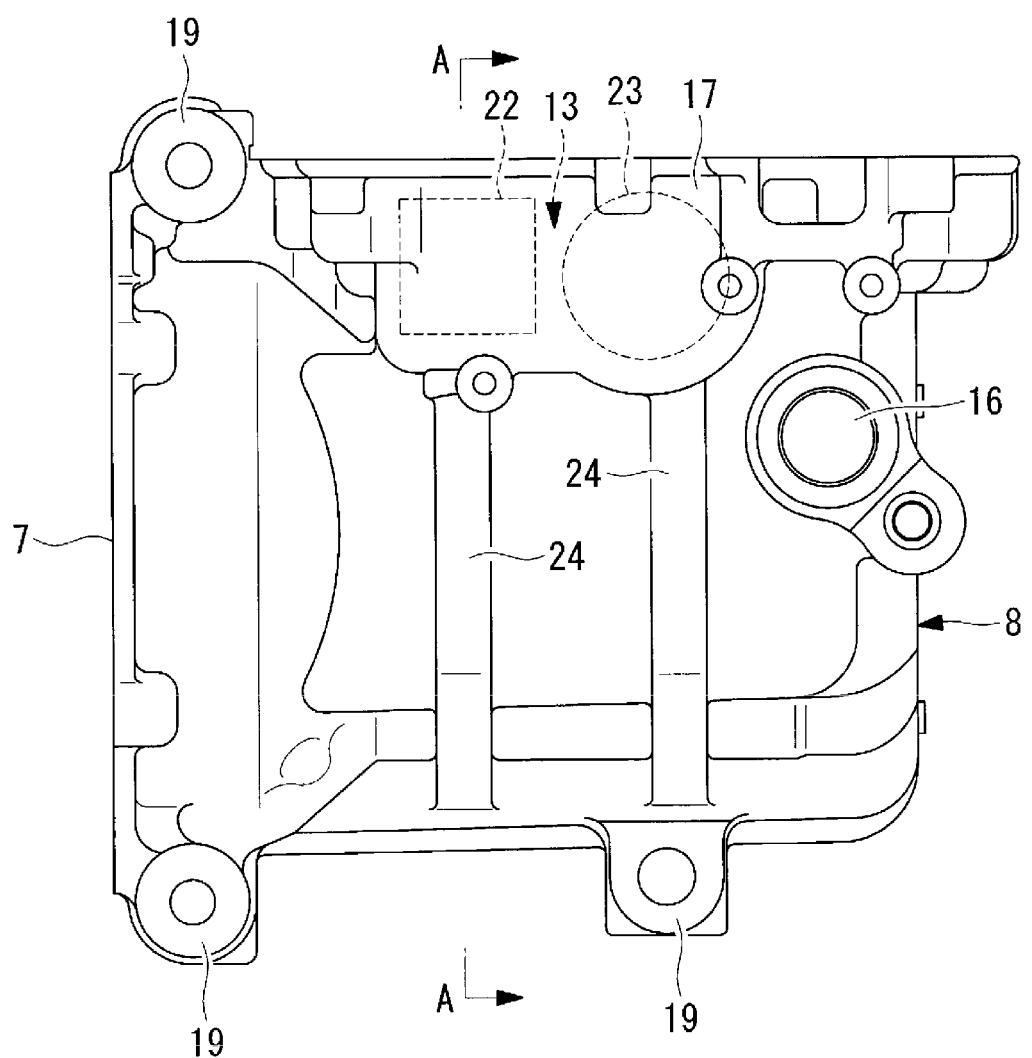
FIG. 5 is a right side view of FIG. 2.
Figure 6:
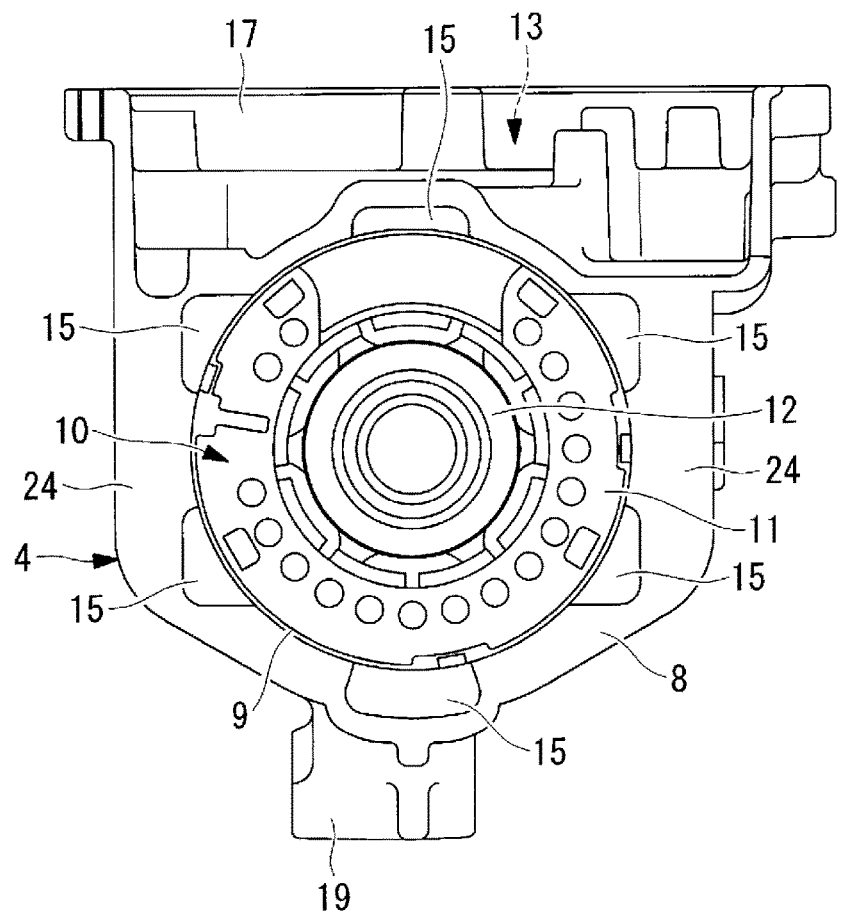
FIG. 6 is a cross-sectional view taken along A-A in FIG. 5.

In the present embodiment, to solve the above-described problems, one or more lines of ribs 24 are provided on the outer peripheral side portion (side surface) of the motor housing main body 8, protruding outward and extending in the vertical direction. In the embodiment, the ribs 24 are provided, as illustrated in FIGS. 1 and 5, on the positions corresponding to the installation positions of the condenser 22 and the coil 23 included in the filter circuit of the inverter circuit 13 accommodated and installed along one side of the inverter accommodating portion 17. The ribs 24 are provided in two lines parallel to each other, on each of which at least one line of rib is provided. But the present invention is not limited to the above-described example. For another example, only one line of the rib 24 may be provided with the width thereof increased. For still another example, three or more lines of the ribs 24 may be provided, as a matter of course.

Each of the ribs 24 is formed integrally with the side surface of the motor housing main body 8. The rib 24 is provided so as to protrude outward by a certain height thereof, extend in the vertical direction from the lower portion to the upper portion, and be connected to the bottom surface of the part protruding in the lateral direction of the inverter accommodating portion 17.

According to the configuration described above, the present embodiment has the following operational effects.

The above-described vehicle-mounted electric compressor 1 is mounted on a vehicle as a refrigerant compressor of a vehicular air conditioning device, and incorporated in the refrigerant circuit. In the vehicle-mounted electric compressor 1, the refrigerant gas filled in the refrigerant circuit is taken from the refrigerant intake port 16 into the motor housing main body 8 as a low-pressure refrigerant gas. The refrigerant gas subsequently flows through the refrigerant passages 15 around the motor 10, and is then guided toward the compressor housing 3. The low-pressure refrigerant gas is compressed by the compressor included in the compressor housing 3, and then discharged from the refrigerant discharge port 6 toward the refrigerant circuit as a high-pressure refrigerant gas.

On this occasion, the low-pressure refrigerant gas flowing through the refrigerant passages 15 inside the motor housing main body 8 cools the motor 10. The low-pressure refrigerant gas also cools heat-releasing components such as the power transistor and the condenser 22 and the coil 23 in the high-voltage system among components of the inverter circuit 13 accommodated and installed in the inverter accommodating portion 17, by using the motor housing main body 8 as a heat sink. This configuration prevents performance degradation caused by the heat released from the components, thereby ensuring the stable performance for a long time.

According to the present embodiment, the electric compressor motor housing 4 includes the motor housing main body 8, the interior of which is the cylindrical space 9 for including the motor 10, and in which the refrigerant passages 15 are formed around the cylindrical space 9, in the direction of the motor axis. The electric compressor motor housing 4 further includes the inverter accommodating portion 17 provided in the upper portion of the outer periphery of the motor housing main body 8. The electric compressor motor housing 4 further includes the compressor attachment feet 19 provided in the locations in the upper and lower portions of the outer periphery of the motor housing main body 8. The electric compressor motor housing 4 further includes the refrigerant intake port 16 provided on the side surface on the rear end portion of the motor housing main body 8. In particular, the electric compressor motor housing 4 includes one or more lines of ribs 24 provided on the outer peripheral side surface of the motor housing main body 8, protruding outward and extending in the vertical direction.

The upper portion and the lower portion of the outer periphery of the motor housing main body 8 is ensured to have sufficient rigidity because the inverter accommodating portion 17 and the compressor attachment feet 19 are provided thereon. In contrast, the outer peripheral side surface of the motor housing main body 8 is liable to have insufficient rigidity. Providing one or more lines of the ribs 24 thereon protruding outward and extending in the vertical direction can thus increase the rigidity of the motor housing main body 8 without increasing the wall thickness of the entire housing. In addition, the ribs 24 increase the cross-sectional area of the wall portion coupling the side surface of the motor housing main body 8 to the inverter accommodating portion 17 provided in the upper portion of the outer periphery of the motor housing main body 8. This configuration can increase the area of the radiating surface for heat transfer from the inverter accommodating portion 17 to the refrigerant flowing through the refrigerant passages 15 inside the motor housing main body 8.

This configuration can therefore increase the rigidity of the motor housing main body 8 and suppress deformation thereof, thereby reducing vibration and noise. In addition, this configuration can increase cooling performance of components of the inverter circuit 13 accommodated and installed in the inverter accommodating portion 17. This can suppress performance degradation caused by the heat released from the components, and increase the reliability.

Figure 7A:
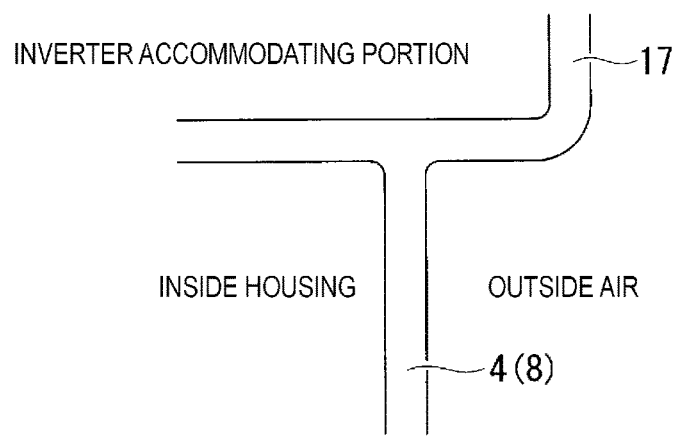
FIG. 7A is a schematic view for explaining an effect of temperature differential on a vertical cross-sectional surface along a rib in the vertical direction provided on the side surface of the above-described motor housing.

In an embodiment in which the refrigerant (intake temperature) inside the motor housing main body 8 cools the inside of the inverter accommodating portion 17, an effect of providing the above-described ribs 24 on the side surface of the motor housing main body 8 are examined as follows with reference to FIGS. 7A to 7C.

Where the temperature inside the inverter accommodating portion 17 is $T_1$, the temperature inside the motor housing 4

(inside the refrigerant passage 15) is $T_2$, and the outdoor temperature is $T_3$, the temperature differential D among the temperatures above are as follows:

$$D=(B \times E)/(A \times C) \cdot T_3 > T_1 > T_2$$

where B is a thickness of the housing wall portion, E is an amount of heat, A is an area of the heat transfer portion, and C is a coefficient of thermal conductivity.

Figure 7B:
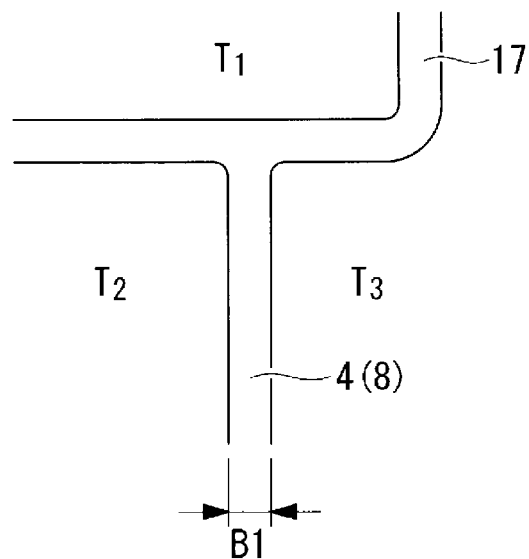
FIG. 7B is a schematic view for explaining the effect of temperature differential on a vertical cross-sectional surface along a rib in the vertical direction provided on the side surface of the above-described motor housing.
Figure 7C:
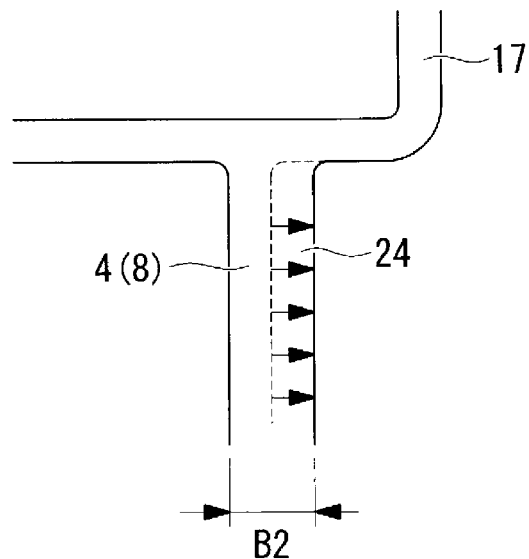
FIG. 7C is a schematic view for explaining the effect of temperature differential on a vertical cross-sectional surface along a rib in the vertical direction provided on the side surface of the above-described motor housing.

Providing the ribs 24 as described above increases the thickness B of the wall portion, as illustrated in FIGS. 7B and 7C, from B1 to B2 (B2>B1). As a result, (1) The temperature differential D between the outdoor temperature $T_3$ and the temperature inside the inverter accommodating portion 17 $T_1$ is increased, thereby reducing the effect of temperature of the outdoor temperature $T_3$ on the inverter accommodating portion 17.

(2) The temperature differential D between the outdoor temperature $T_3$ and the temperature inside the motor housing 4 (inside the refrigerant passage 15) $T_2$ is increased, thereby reducing the effect of temperature of the outdoor temperature on the temperature inside the motor housing 4 (inside the refrigerant passage 15).

When cooling the inverter circuit 13, therefore, the effect of the temperature outside the compressor (outdoor temperature, for example) can be hardly received. The components of the inverter circuit 13 can be thus suitably cooled by utilizing the low-pressure refrigerant gas, thereby maintaining and ensuring the performance thereof.

In addition, in the embodiment, the ribs 24 are provided on the positions corresponding to the installation positions of the condenser 22 and the coil 23 included in the inverter circuit 13 accommodated and installed along one side of the inverter accommodating portion 17. At least one line of the rib 24 is provided for each of the installation positions of the condenser 22 and the coil 23. Although the condenser 22 and the coil 23 included in the filter circuit of the inverter circuit 13 are accommodated and installed along one side of the inverter accommodating portion 17, the heat from the condenser 22 and the coil 23 can be released to the refrigerant flowing through the refrigerant passages 15 inside the motor housing main body 8 via the heat transfer portion (wall portion), the cross-sectional area thereof is increased by the ribs 24 provided on the positions corresponding to the installation positions of the condenser 22 and the coil 23.

Therefore, this configuration achieves the following effect in addition to increasing the rigidity of the motor housing 4 to reduce vibration and noise. That is, the configuration can also ensure cooling performance for the condenser 22 and the coil 23 included in the filter circuit of the inverter circuit 13, thereby suppressing performance degradation caused by the heat released from the components. Furthermore, the configuration can increase the flexibility of layout of components included in the filter circuit.

Other Embodiments

Next, other embodiments of the present invention will be described with reference to FIGS. 8 to 11.

One or more lines of the ribs 24 may be provided on the outer peripheral side portion (side surface) of the motor housing main body 8 in the following manner.

Figure 8:
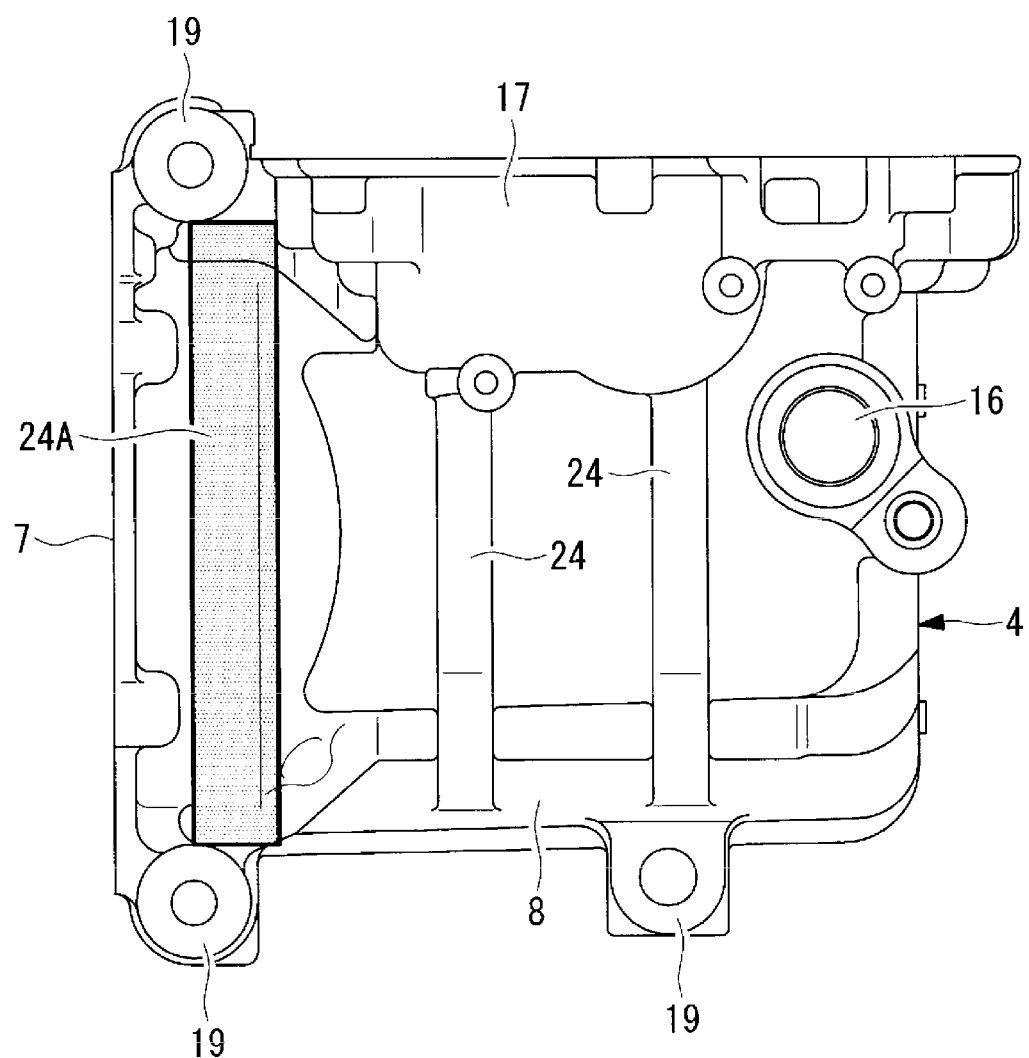
FIG. 8 is a right side view of FIG. 2 illustrating a motor housing according to another embodiment (1) of the present invention.

(1) In the present embodiment, at least one line of the ribs 24 is provided in for each of the positions corresponding to the installation positions of the condenser 22 and the coil 23 included in the inverter circuit 13, in the same manner as the above-described first embodiment. In addition, as illustrated in FIG. 8, one line of a rib 24A is further provided in the vertical direction along the vicinity of the mating surface 7 of the opening portion capable of coupling to the compressor housing 3 of the motor housing main body 8.

When the electric compressor is mounted on a vehicle and if rainwater is scattered from a road surface to a side surface of the motor housing main body 8 while driving, or a cleaning fluid enters there while washing, the rainwater or cleaning fluid may reach the mating surface 7 between the motor housing main body 8 and the compressor housing 3. But providing the rib 24A along the mating surface 7 can prevent the rainwater or cleaning fluid and the like from reaching the mating surface 7. Therefore, this configuration achieves the following effect in addition to increasing the rigidity of the motor housing 4 to reduce vibration and noise, and increasing cooling performance of components of the inverter circuit 13, thereby suppressing performance degradation caused by the heat released from the components. That is, the configuration can further increase corrosion resistance of a seal member and the like provided on the mating surface 7 between the motor housing 4 and the compressor housing 3.

Figure 9:
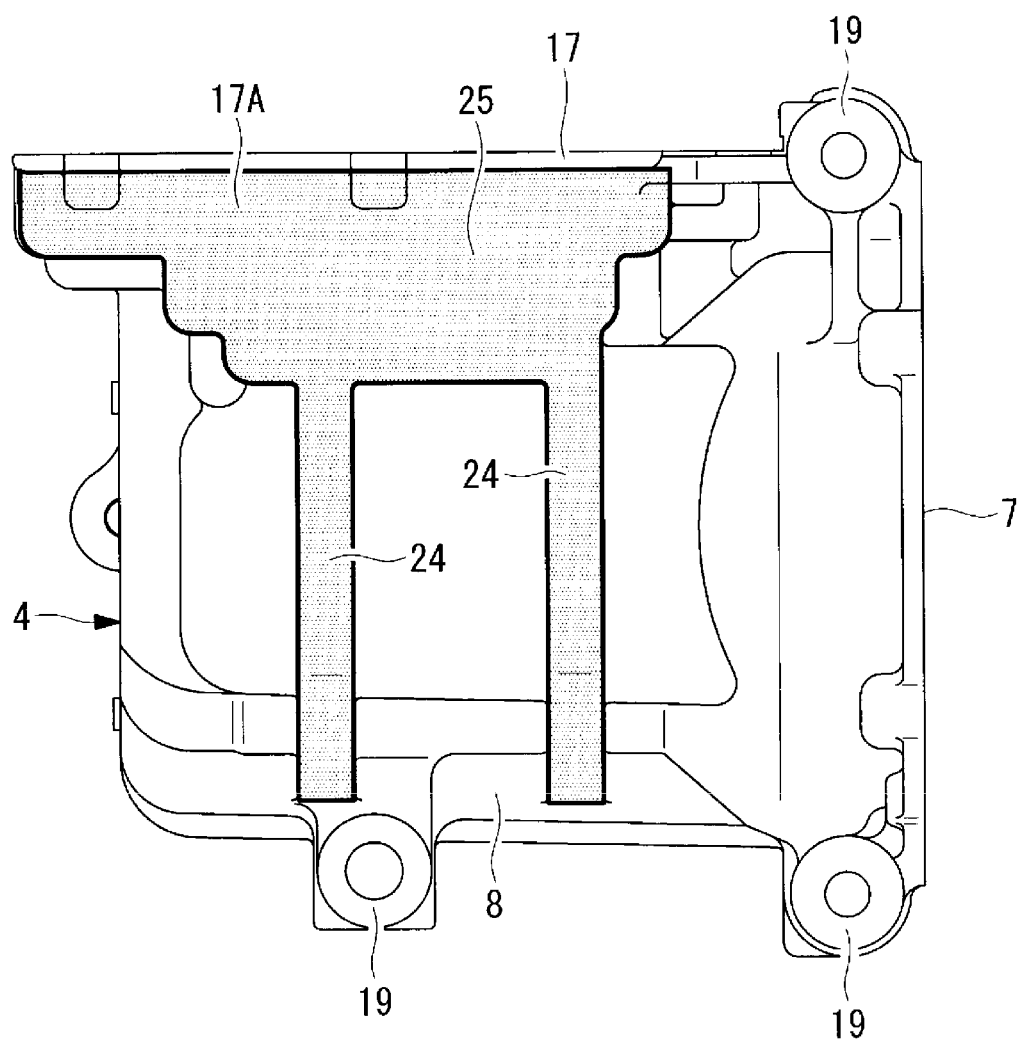
FIG. 9 is a left side view of FIG. 2 illustrating a motor housing according to another embodiment (2) of the present invention.

(2) In the present embodiment, one or more ribs 24 with a predetermined space therebetween are provided on the side surface opposed to the side surface on which the refrigerant intake port 16 on the motor housing main body 8 is provided. The height of the lateral protrusion of the ribs 24 is defined same as the height of a side surface 17A of the inverter accommodating portion 17, as illustrated in FIG. 9. That is, a flat surface 25 flush with the side surface 17A of the inverter accommodating portion 17 is formed.

When handling the electric compressor 1, this configuration allows the electric compressor 1 to be placed in a stable manner with the flat surface 25 formed on the side surface of the motor housing main body 8 facing down. Therefore, this configuration achieves the following effect in addition to increasing the rigidity of the motor housing 4 to reduce vibration and noise, and increasing cooling performance of components of the inverter circuit 13, thereby suppressing performance degradation caused by the heat released from the components. That is, the configuration can also facilitate handling when incorporating the electric compressor 1 to a vehicle, for example.

Figure 10:
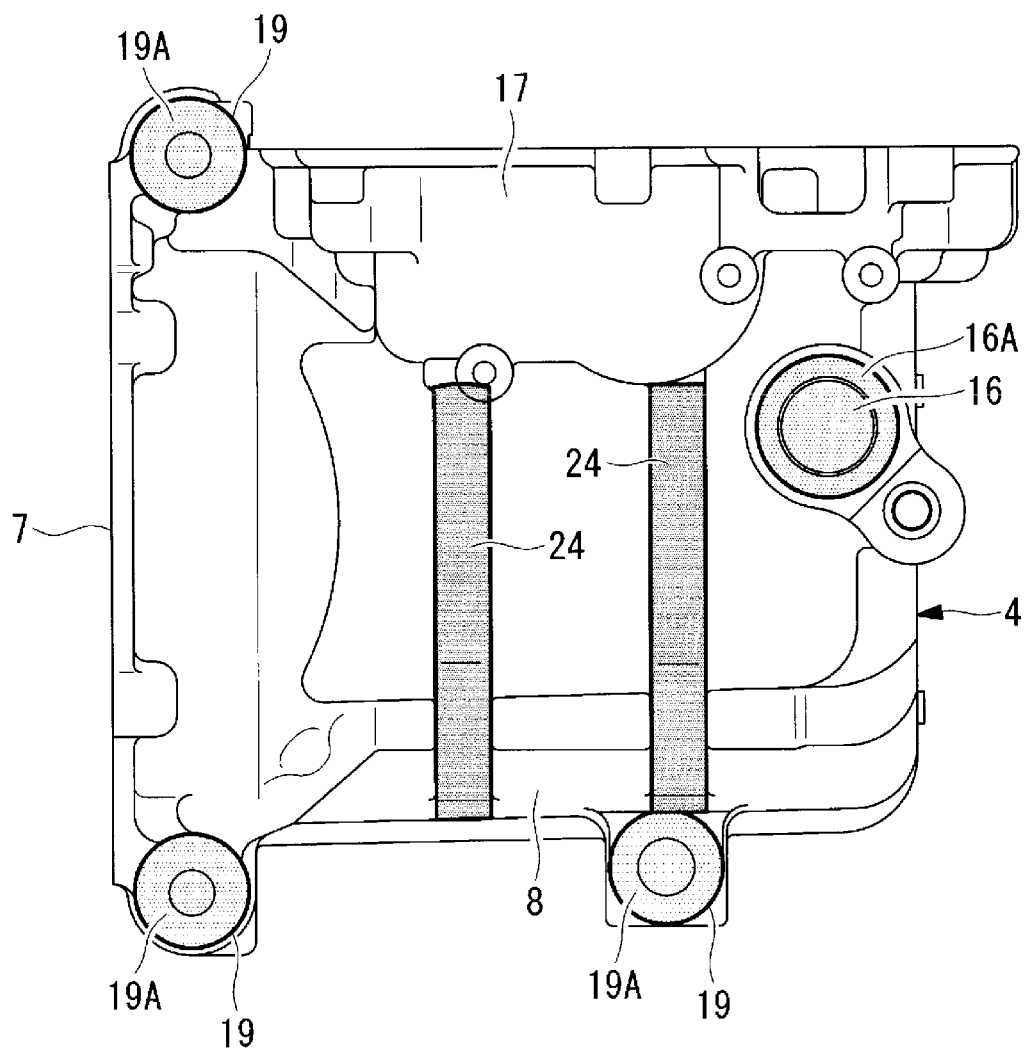
FIG. 10 is a right side view of FIG. 2 illustrating a motor housing according to another embodiment (3) of the present invention.
Figure 11:
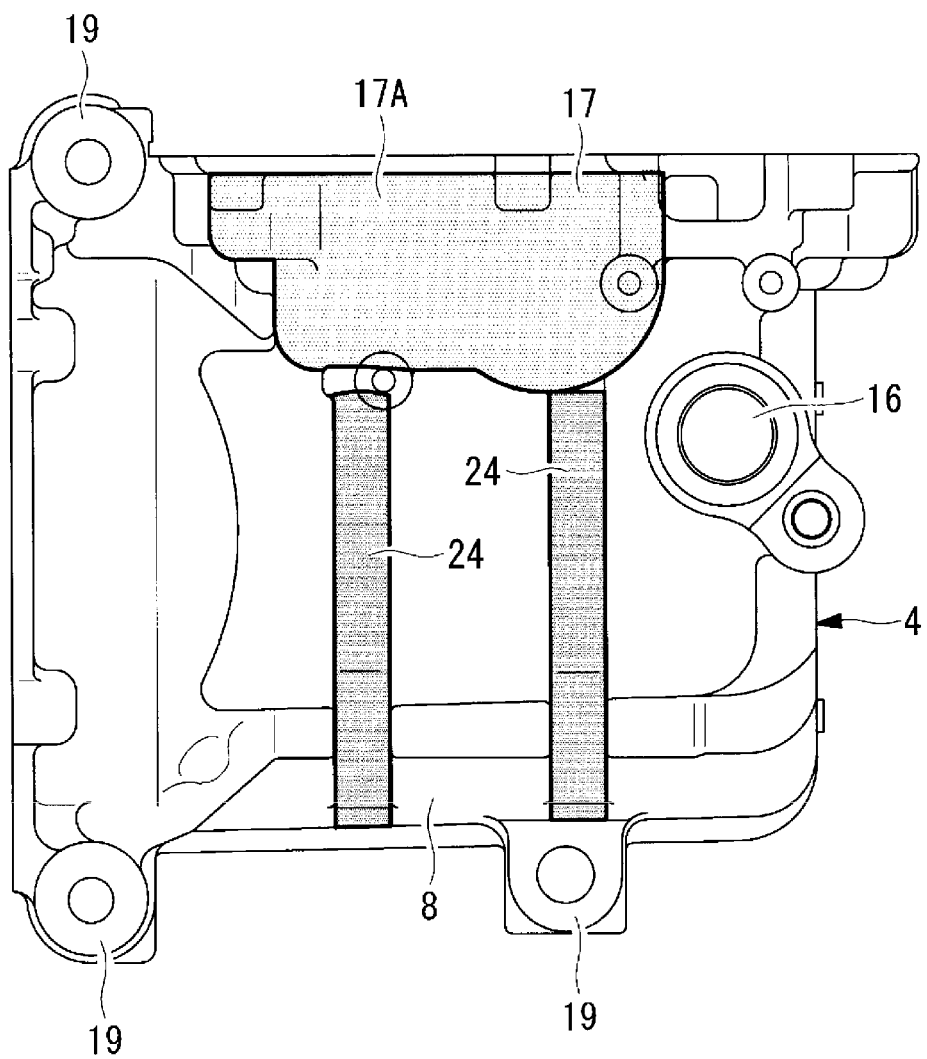
FIG. 11 is a right side view of FIG. 2 illustrating a motor housing according to another embodiment (4) of the present invention.

(3) In the present embodiment, one or more ribs 24 are provided on the side surface same as the side surface on which the refrigerant intake port 16 on the motor housing main body 8 is provided. The height of lateral protrusion of the ribs 24 is defined higher than the positions of a seat surface 16A of the refrigerant intake port 16 and a seat surface 19A of the compressor attachment feet 19, as illustrated in FIG. 10.

This configuration can prevent the seat surface 16A and the seat surface 19A from being damaged because the height of protrusion of the ribs 24 is defined higher than the seat surface 16A and the seat surface 19A. This effect is achieved when placing the motor housing main body 8 with the side surface facing down on which the seat surface 16A of the refrigerant intake port 16 and the seat surface 19A of the compressor attachment feet 19 are provided. The effect is also achieved when other articles come into contact with the side surface on which the seat surface 16A and the seat surface 19A are provided. Therefore, this configuration achieves the following effect in addition to increasing the rigidity of the motor housing 4 to reduce vibration and noise, and increasing cooling performance of components of the inverter circuit 13, thereby suppressing performance degradation caused by the heat released from the components. That is, the configuration can also eliminate refrigerant leakage or faulty installation of the electric compressor 1 caused by damage to the seat surface 16A or the seat surface 19A, for example.

(4) In the present embodiment, one or more ribs 24 are provided on the side surface same as the side surface on which the refrigerant intake port 16 on the motor housing main body 8 is provided. The height of lateral protrusion of the ribs 24 is defined higher than the height of outward protrusion of the side surface 17A of the inverter accommodating portion 17.

This configuration can protect the inverter circuit 13 accommodated in the inverter accommodating portion 17 if the electric compressor 1 is mounted in a vehicle with the side surface of the motor housing main body 8, on which the ribs 24 are provided, facing forward. This effect is achieved if the vehicle is involved in a collision accident and the rib portions having high rigidity can receive an impact thereof, for example. Therefore, this configuration achieves the following effect in addition to increasing the rigidity of the motor housing 4 to reduce vibration and noise, and increasing cooling performance of components of the inverter circuit 13, thereby suppressing performance degradation caused by the heat released from the components. That is, the configuration can also prevent a high-voltage short circuit caused by damage to the inverter accommodating portion 17 if the vehicle is involved in a collision accident, and suppress expansion of the accident.

Furthermore, in the vehicle-mounted electric compressor 1 according to the present embodiment, the motor housing 4 is configured as described above, and such that an opening portion at one end thereof is coupled to the compressor housing 3 including the compressor. That is, the inverter circuit 13 is integrally incorporated in the housing 2 including the motor 10 and the compressor. This configuration can therefore increase the rigidity of the motor housing 4 of the electric compressor 1 and suppress deformation thereof, thereby reducing vibration and noise. In addition, this configuration can increase cooling performance of components of the inverter circuit 13 accommodated in the inverter accommodating portion 17. This suppresses performance degradation caused by the heat released from the components. The configuration can thus increase the reliability and achieve the vehicle-mounted electric compressor 1 with lower noise.

Note that the present invention is not limited to the invention according to the above-described embodiments and can be modified as required without departing from the spirit of the present invention. For example, the compressor included in the compressor housing 3 may be any type of compressors. It is to be understood that the configuration of the inverter circuit 13 accommodated and installed in the inverter accommodating portion 17 or power supply configuration of electric power and control signals to the inverter circuit 13 can be modified in a variety of other forms.

REFERENCE SIGNS LIST

1 Vehicle-mounted electric compressor
2 Housing
3 Compressor housing
4 Motor housing
7 Mating surface
8 Motor housing main body
9 Cylindrical space
10 Motor
13 Inverter circuit
15 Refrigerant passage
16 Refrigerant intake port
16A Refrigerant intake port seat surface
17 Inverter accommodating portion
17A Inverter accommodating portion side surface
19 Compressor attachment feet
19A Compressor attachment feet seat surface
22 Condenser
23 Coil
24, 24A Rib
25 Flat surface

The invention claimed is:

1. An electric compressor motor housing, comprising:
a motor housing main body, one end thereof is an opening portion capable of coupling to a compressor housing, interior of the motor housing main body being a cylindrical space for comprising a motor;
a plurality of refrigerant passages formed around the cylindrical space in the motor housing main body in a direction of a motor axis;
an inverter accommodating portion provided in an upper portion of an outer periphery of the motor housing main body, an inverter circuit that drives the motor being accommodated and installed in an interior of the inverter accommodating portion;
compressor attachment feet provided in a plurality of locations in the upper portion and a lower portion of the outer periphery of the motor housing main body; and
a refrigerant intake port provided on a side surface on a rear end portion of the motor housing main body, the refrigerant intake port being communicated with an internal space of the motor housing main body, wherein
one or more lines of ribs are provided on an outer peripheral side surface of the motor housing main body, protruding outward and extending in the vertical direction.

2. The electric compressor motor housing according to claim 1, wherein at least one line of the one or more lines of ribs is provided for each of positions corresponding to installation positions of a condenser and a coil included in the inverter circuit accommodated and installed along one side of the inverter accommodating portion.

3. The electric compressor motor housing according to claim 1, wherein at least one of the ribs is provided in a vicinity of and along a mating surface of the opening portion capable of coupling to the compressor housing.

4. The electric compressor motor housing according to claim 1, wherein the one or more lines of the ribs are provided on one side surface of the motor housing main body, with a height of protrusion of the ribs being defined same as a height of a side surface of the inverter accommodating portion, thereby forming a flat surface flush with the side surface of the inverter accommodating portion.

5. The electric compressor motor housing according to claim 1, wherein the one or more lines of the ribs are provided on a side surface same as a side surface on which the refrigerant intake port on the motor housing main body is provided, with a height of outward protrusion of the ribs being defined higher than positions of a seat surface of the refrigerant intake port and a seat surface of the compressor attachment feet.

6. The electric compressor motor housing according to claim 1, wherein the one or more lines of the ribs are provided on a side surface same as a side surface on which the refrigerant intake port on the motor housing main body is provided, with a height of outward protrusion of the ribs being defined higher than a height of outward protrusion of a side surface of the inverter accommodating portion.

7. A vehicle-mounted electric compressor, comprising the electric compressor motor housing according to claim 1, wherein an opening portion at one end of the motor housing is coupled to a compressor housing comprising a compressor mechanism, whereby an inverter circuit is integrally incorporated in a housing comprising a motor and a compressor.

8. The electric compressor motor housing according to claim 2, wherein at least one of the ribs is provided in a vicinity of and along a mating surface of the opening portion capable of coupling to the compressor housing.

9. The electric compressor motor housing according to claim 2, wherein the one or more lines of the ribs are provided on one side surface of the motor housing main body, with a height of protrusion of the ribs being defined same as a height of a side surface of the inverter accommodating portion, thereby forming a flat surface flush with the side surface of the inverter accommodating portion.

10. The electric compressor motor housing according to claim 3, wherein the one or more lines of the ribs are provided on one side surface of the motor housing main body, with a height of protrusion of the ribs being defined same as a height of a side surface of the inverter accommodating portion, thereby forming a flat surface flush with the side surface of the inverter accommodating portion.

11. The electric compressor motor housing according to claim 2, wherein the one or more lines of the ribs are provided on a side surface same as a side surface on which the refrigerant intake port on the motor housing main body is provided, with a height of outward protrusion of the ribs being defined higher than positions of a seat surface of the refrigerant intake port and a seat surface of the compressor attachment feet.

12. The electric compressor motor housing according to claim 3, wherein the one or more lines of the ribs are provided on a side surface same as a side surface on which the refrigerant intake port on the motor housing main body is provided, with a height of outward protrusion of the ribs being defined higher than positions of a seat surface of the refrigerant intake port and a seat surface of the compressor attachment feet.

13. The electric compressor motor housing according to claim 4, wherein the one or more lines of the ribs are provided on a side surface same as a side surface on which the refrigerant intake port on the motor housing main body is provided, with a height of outward protrusion of the ribs being defined higher than positions of a seat surface of the refrigerant intake port and a seat surface of the compressor attachment feet.

14. The electric compressor motor housing according to claim 2, wherein the one or more lines of the ribs are provided on a side surface same as a side surface on which the refrigerant intake port on the motor housing main body is provided, with a height of outward protrusion of the ribs being defined higher than a height of outward protrusion of a side surface of the inverter accommodating portion.

15. The electric compressor motor housing according to claim 3, wherein the one or more lines of the ribs are provided on a side surface same as a side surface on which the refrigerant intake port on the motor housing main body is provided, with a height of outward protrusion of the ribs being defined higher than a height of outward protrusion of a side surface of the inverter accommodating portion.

16. The electric compressor motor housing according to claim 4, wherein the one or more lines of the ribs are provided on a side surface same as a side surface on which the refrigerant intake port on the motor housing main body is provided, with a height of outward protrusion of the ribs being defined higher than a height of outward protrusion of a side surface of the inverter accommodating portion.

17. The electric compressor motor housing according to claim 5, wherein the one or more lines of the ribs are provided on a side surface same as a side surface on which the refrigerant intake port on the motor housing main body is provided, with a height of outward protrusion of the ribs being defined higher than a height of outward protrusion of a side surface of the inverter accommodating portion.

18. A vehicle-mounted electric compressor, comprising the electric compressor motor housing according to claim 2, wherein an opening portion at one end of the motor housing is coupled to a compressor housing comprising a compressor mechanism, whereby an inverter circuit is integrally incorporated in a housing comprising a motor and a compressor.

19. A vehicle-mounted electric compressor, comprising the electric compressor motor housing according to claim 3, wherein an opening portion at one end of the motor housing is coupled to a compressor housing comprising a compressor mechanism, whereby an inverter circuit is integrally incorporated in a housing comprising a motor and a compressor.

20. A vehicle-mounted electric compressor, comprising the electric compressor motor housing according to claim 4, wherein an opening portion at one end of the motor housing is coupled to a compressor housing comprising a compressor mechanism, whereby an inverter circuit is integrally incorporated in a housing comprising a motor and a compressor.

* * * * *